US012659309B2

(12) United States Patent
Simmermon et al.

(10) Patent No.: US 12,659,309 B2
(45) Date of Patent: Jun. 16, 2026

(54) METHOD AND APPARATUS FOR UTILIZATION OF DOMAIN NAME SYSTEM FOR EFFICIENT CERTIFICATE DATA RETRIEVAL IN PLUG AND CHARGE ECOSYSTEMS

(71) Applicant: Irdeto B.V., Hoofddorp (NL)

(72) Inventors: James Patrick Simmermon, Chehalis, WA (US); Darlene Riley Nepean, Ontario (CA)

(73) Assignee: IRDETO B.V., Hoofddorp (NL)

( * ) Notice: Subject to any disclaimer, the term of this patent is extended or adjusted under 35 U.S.C. 154(b) by 94 days.

(21) Appl. No.: 18/615,945

(22) Filed: Mar. 25, 2024

(65) Prior Publication Data

US 2025/0184321 A1      Jun. 5, 2025

Related U.S. Application Data

(60) Provisional application No. 63/606,516, filed on Dec. 5, 2023.

(51) Int. Cl.
    *H04L 9/40*        (2022.01)
    *G06F 9/54*        (2006.01)

(52) U.S. Cl.
    CPC .......... *H04L 63/0823* (2013.01); *G06F 9/547* (2013.01)

(58) Field of Classification Search
    None
    See application file for complete search history.

(56) References Cited

U.S. PATENT DOCUMENTS

| | | | |
|---|---|---|---|
| 2013/0160086 A1* | 6/2013 | Katar ...................... H04L 67/51 726/4 |
| 2019/0253411 A1* | 8/2019 | Joyner ................ H04L 61/4511 |
| 2022/0212559 A1* | 7/2022 | Shin ........................ B60L 53/60 |

* cited by examiner

*Primary Examiner* — Syed A Roni
(74) *Attorney, Agent, or Firm* — James J. DeCarlo; Greenberg Traurig, LLP

(57) ABSTRACT

A method and system for improving the efficiency of locating a pool operator in a Plug and Charge ecosystem. The method includes receiving an identifier associated with a user, using a Domain Name System (DNS) as a reference engine for the received identifier, generating a fully qualified domain name using the received identifier, and directing the fully qualified domain name to an internet address of a corresponding pool operator. The system includes one or more processors, a DNS, a fully qualified domain name generator, and a directing module. A non-transitory computer-readable medium storing instructions for performing the method is also disclosed.

15 Claims, 6 Drawing Sheets

METHOD AND APPARATUS FOR UTILIZATION OF DOMAIN NAME SYSTEM FOR EFFICIENT CERTIFICATE DATA RETRIEVAL IN PLUG AND CHARGE ECOSYSTEMS

BACKGROUND

The field of electric vehicle (EV) charging has seen significant advancements in recent years. One such advance is the used "Plug and Charge" ecosystems. The VDE (German: Verband der Elektrotechnik, Elektronik und Informationstechnik) is a German technical-scientific association best known for creating and maintaining standards in the field of electric safety. One such standard is ISO 15118, a standard for electric road vehicles.

Secure Plug & Charge systems described in ISO 15118 enable an EV to automatically identify and authorize itself to a compatible charging station (operated by a "charge point operator" and a corresponding "mobility operator") to receive energy for recharging its battery and to provide information for accounting purposes. A vehicle ID is used to identify the vehicle. Thus, the only action required by the driver is to plug the charging cable into the EV and/or charging station, because the car and the charger identify themselves to each other by exchanging certificates which were provided beforehand via a certificate pool to facilitate payment. Certificates are stored in multiple "pools" respectively corresponding to a myriad of charge provisioning contracts to which the customers and charge point operators are parties. The pools can be stored in various databases in various distributed locations. Therefore, a given certificate can be stored in one or more of the various certificate pools based on the contracts to which the customer and the charge point operator are parties.

Conventional processes leverage Process Context Identifiers (PCIDs). A PCID includes a World Manufacturer Identifier (WMI), a unique identifier and a check digit. The WMI is 3 characters long and uniquely identifies the manufacturer (OEM) that made the vehicle. Further, a E-Mobility Authentication Identifier (EMAID), is used to allow the EV to automatically identify itself to a compatible charging station and receive energy for recharging its battery, without requiring any user intervention or payment method. EMAID is part of the ISO 15118 standard, which defines a vehicle to grid (V2G) communication interface for bi-directional charging/discharging of EVs. The EMAID includes a CountryCode, a ProviderID, an EMA Instance, and a check digit. EMA stands for Endpoint Management Assistant-a software solution that enables remote management of devices using a web-based interface.

The process accomplished by Plug and Charge systems can be divided into four subprocesses:

1) vehicle production and preparation of contract-based billing (in which the OEM generates a Provisioning Certificate for each EV (corresponding to a vehicle ID) during production and installs a trust store containing all relevant Root Certificates from a RootCertificate Pool.

2) contract conclusion and vehicle assignment (in which a mobility operator concludes a charging contract for a specific customer's EV, using the vehicle's provisioning certificate from the provisioning certificate pool and the contract data is provided to the certificate provisioning service and/or the mobility operator).

3) periodic provisioning of contract data (signing contract data and storing in a contract pool, generating contract data by the mobility operator and storing the data in the contract certificate pool).

4) installation of contract data (providing signed contract data to charge point operator on request, and delivery of signed contract data to the OEM).

A persistent challenge is the efficient and quick identification of certificates associated with an identifier from one or more of the many certificate pools (in subprocess 2 above, for example). This process is crucial for the required handshake between the Electric Vehicle and the charging station operated by a charge point operator, which must be completed within a strict time limit (typically a few seconds).

Conventional Plug and Charge systems utilize the following methodology for locating certificates. Each contract certificate pool provides a Representational State Transfer (REST) Application Programming Interface (API) to request registered Certificates. During the handshake process, the Charge Point Operator must query each contract certificate pool, through the respective API of each certificate pool, until one of the certificate pools returns an indication that the requested certificate is stored in the corresponding pool. This can require many (potentially thousands) of queries before a successful response is received. Alternatively, every vehicle identifier in the plug and charge ecosystem can be stored in correspondence to a link to the corresponding pool operator(s). However, this approach requires a very large database and the requisite maintenance thereof. Further, such a database could require a vast amount of computing resources in order to process queries in an acceptable manner.

As shown in FIG. 1a, a manufacturer (OEM) can store provisioning certificates and a PCID in a memory located on/in the vehicle in a secure manner, as shown at 1. The OEM also stores a provisioning certificate in a provisioning pool associated with A vendor 107, at 2. At 3, the customer obtains the vehicle and, at 4, the customer enters into a contract for charging the vehicle with mobility operator 104. Step 4 can be part of the purchase transaction of the vehicle or can be accomplished in any manner, such as though and app on the mobile phone of the vehicle owner (user/customer). At 5, mobility operator 104 obtains the provisioning certificate of the vehicle owner from provisioning pool 107. At 6, mobility operator 104 stores the certificate, in association with the contract, in contract pool 106. At 7, the vehicle owner requests charging from charge point operator 102 (by plugging in the vehicle to a charging station, for example) and, at 8, charge point operator 102 obtains the correct certificate from contract pool 106 to verify the owner and the contract.

The first time a customer charges the vehicle, the car asks the contract pool for any contracts associated with the PCID of the vehicle and stores certificates associated with those contracts in the vehicle memory device. Subsequently, anytime the vehicle charges, it will use the stored contract certificate to authorize the transaction. Alternatively, OEM 108 can push the certificate to the vehicle instead of installing on first authorization.

The data flow of FIG. 1a is relatively simple. However, as the ecosystem grows (potentially many thousands of mobility operators and many thousands of pools), the task of checking each individual pool operator to determine if the certificate is present in the pool becomes increasingly onerous and time-consuming. At some point, the system becomes unable to complete a handshake in the desired/required timeframe. This issue poses a significant barrier to the successful operation of the Plug and Charge ecosystem.

Therefore, there is a need for a computing system and method that locates the correct pool/pool operator for a given EV and charger combination in an efficient manner without using excessive computing resources.

SUMMARY

Disclosed implementation provide, a system is provided for improving the efficiency of locating a pool operator in a Plug and Charge ecosystem. The method involves receiving an identifier associated with a user and utilizing a Domain Name System (DNS) as a reference engine for the received identifier. A fully qualified domain name is generated using the received identifier and directed to an internet address of a corresponding pool operator.

One example of a disclosed implementation is a method for leveraging a domain name system (DNS) for improving the efficiency of locating a certificate in a Plug and Charge ecosystem, the method comprising: receiving a user identifier associated with a user; receiving charge provider identifier associated with one or more charge providers; generating a first fully qualified domain name by prepending the user identifier to a predetermined domain name of the DNS; generating a second fully qualified domain name by prepending the charge provider identifier to the predetermined domain name; wherein the DNS stored the provider User ID and the at least one provider ID as a DNS entry pointing to the a corresponding charge pool operator computing system whereby the first fully qualified domain name specifies a direct route via the DNS to correct contract pool operator and the second fully qualified domain name specifies a direct route via the DNS to correct contract pool; and using the first fully qualified domain name and the second fully qualified domain name in and API call for the certificate.

Another example of a disclosed implementation is a computing system for leveraging a domain name system (DNS) for improving the efficiency of locating a certificate in a Plug and Charge ecosystem, the system comprising: at least one computer hardware processor; and at least one computer memory device storing instructions thereon, which when executed by the at least one processor, cause the at least one processor to carry out the method of: receiving a user identifier associated with a user; receiving charge provider identifier associated with one or more charge providers; generating a first fully qualified domain name by prepending the user identifier to a predetermined domain name of the DNS; generating a second fully qualified domain name by prepending the charge provider identifier to the predetermined domain name; wherein the DNS stored the provider User ID and the at least one provider ID as a DNS entry pointing to a corresponding charge pool operator computing system whereby the first fully qualified domain name specifies a direct route via the DNS to correct contract pool operator and the second fully qualified domain name specifies a direct route via the DNS to correct contract pool; and using the first fully qualified domain name and the second fully qualified domain name in and API call for the certificate.

Another example of a disclosed implementation is a non-transitory computer readable media having instructions thereon which, when executed by a computer processor, cause the computer processor to carry out a method for leveraging a domain name system (DNS) for improving the efficiency of locating a certificate in a Plug and Charge ecosystem, the method comprising: receiving a user identifier associated with a user; receiving charge provider identifier associated with one or more charge providers; generating a first fully qualified domain name by prepending the user identifier to a predetermined domain name of the DNS; generating a second fully qualified domain name by prepending the charge provider identifier to the predetermined domain name; wherein the DNS stored the provider User ID and the at least one provider ID as a DNS entry pointing to a corresponding charge pool operator computing system whereby the first fully qualified domain name specifies a direct route via the DNS to correct contract pool operator and the second fully qualified domain name specifies a direct route via the DNS to correct contract pool; and using the first fully qualified domain name and the second fully qualified domain name in and API call for the certificate.

BRIEF DESCRIPTION OF THE DRAWING

For a better understanding of the various embodiments described herein and to show more clearly how they may be carried into effect, reference will now be made, by way of example only, to the accompanying drawings in which.

DETAILED DESCRIPTION

Figure 1A:
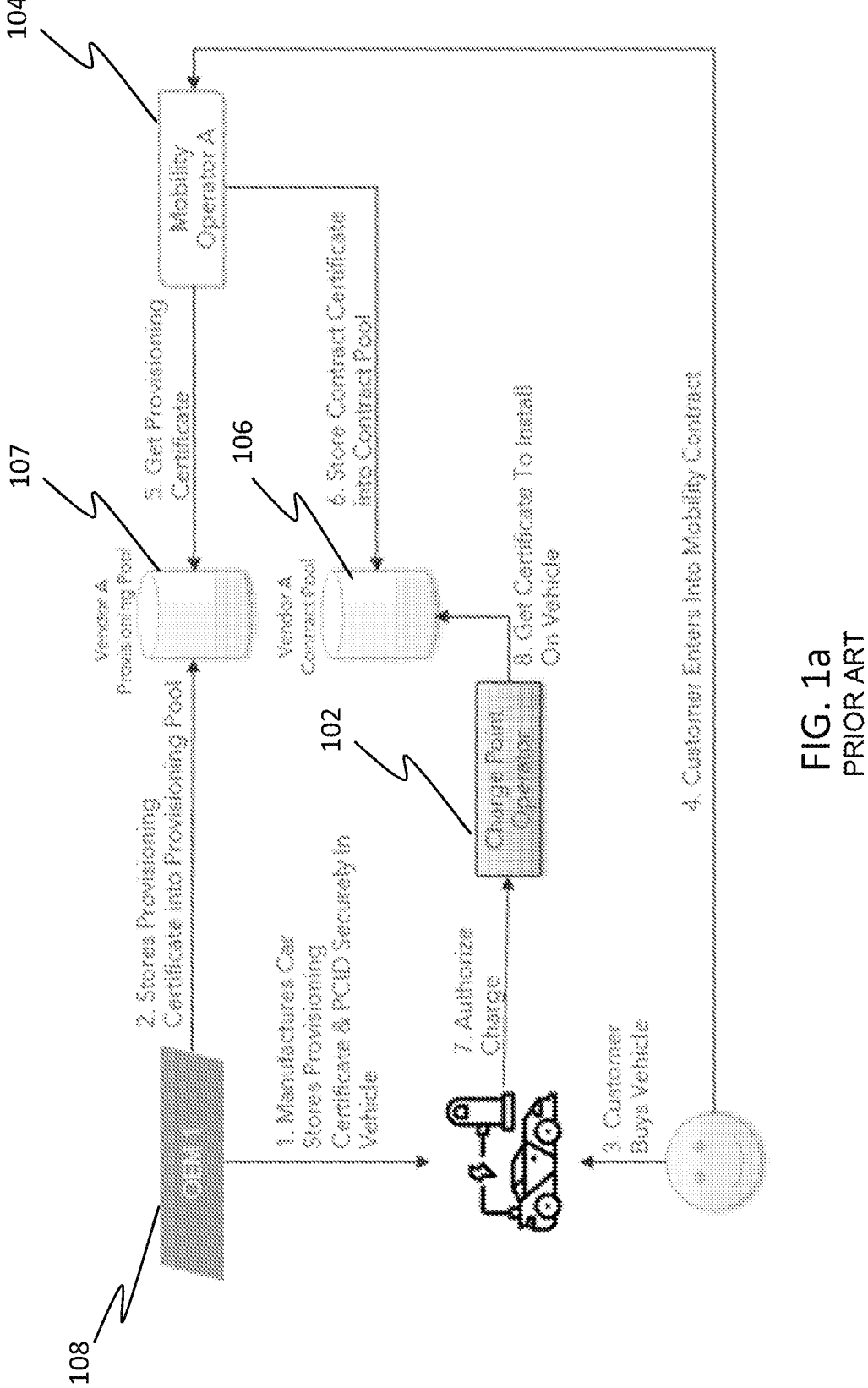
FIG. 1a is a schematic diagram of a Plug and Charge system.

As discussed above, when a Plug and Charge ecosystem user (such as a Charge Point Operator processing a user request to charge an EV) wishes to get certificate data from the certificate pool associated with a vehicle identifier, the system must check each individual contract pool to determine if the identifier is present in the pool. This action, becomes more onerous and time consuming as the ecosystem grows to include many contract pools operated by many pool operators. Given that a handshake between the EV and the charging station must be completed within about 5 seconds, and obtaining certificate information is part of the handshake process, the increased time to find the pool operator becomes a barrier to usability, and the success, of Plug and Charge ecosystems.

Disclosed implementations leverage the Domain Name System (DNS), that is in use worldwide for internet users, as a reference engine for the vehicle identifier. All or part of the vehicle identifier can be used to create a fully qualified domain name that points the user to the correct pool operator internet address (e.g., using a CNAME or A record). CNAME stands for "Canonical Name". CNAME records can be used to alias one name to another. As an example, assume you have both "example.com" and "www.example-.com" pointing to the same application and hosted by the same server. To avoid maintaining two different records, an A record for "example.com" pointing to the server IP address can be created and/or a CNAME record for www.example.com pointing to example.com can be created. This methodology is well-known in internet addressing schemes.

Instead of storing all of the data in a centralized database or making redundant queries to multiple contract pool databases, disclosed implementations use the DNS that is used by internet users (or a corollary DNS) as the mechanism for finding the corresponding pool operator.

Typically, when a web page is accessed using the DNS, a domain name like www.google.com is entered, by a user, into a web browser. In response, the DNS converts "www.google.com" to and IP address, such as 172.217.12.46. The IP address determines the location of a web server on the internet, and the nameserver that the domain is using is queried for any entries for the domain. This conversion process is called DNS resolution. If the requested website's information is stored locally, then the website will begin to load relatively quickly. If not (for example if it is the user's first time visiting the site), a DNS query will be performed to retrieve the correct information. Recursive DNS servers have their own local cache, much like a personal computer.

If the domain is cached in a DNS server, the query will end and the website will display to the user. If a recursive DNS server or servers do not have information stored in cache memory, additional recursive servers are queried. This continues up the chain of authoritative DNS servers. Disclosed implementations can leverage a similar mechanism. The A record corresponding to the domain name is returned to the browser and the corresponding IP address is read from the DNS record and passed it to the web browser. The browser will then connect to the server associated with the A record's IP address and render corresponding website.

Figure 1B:
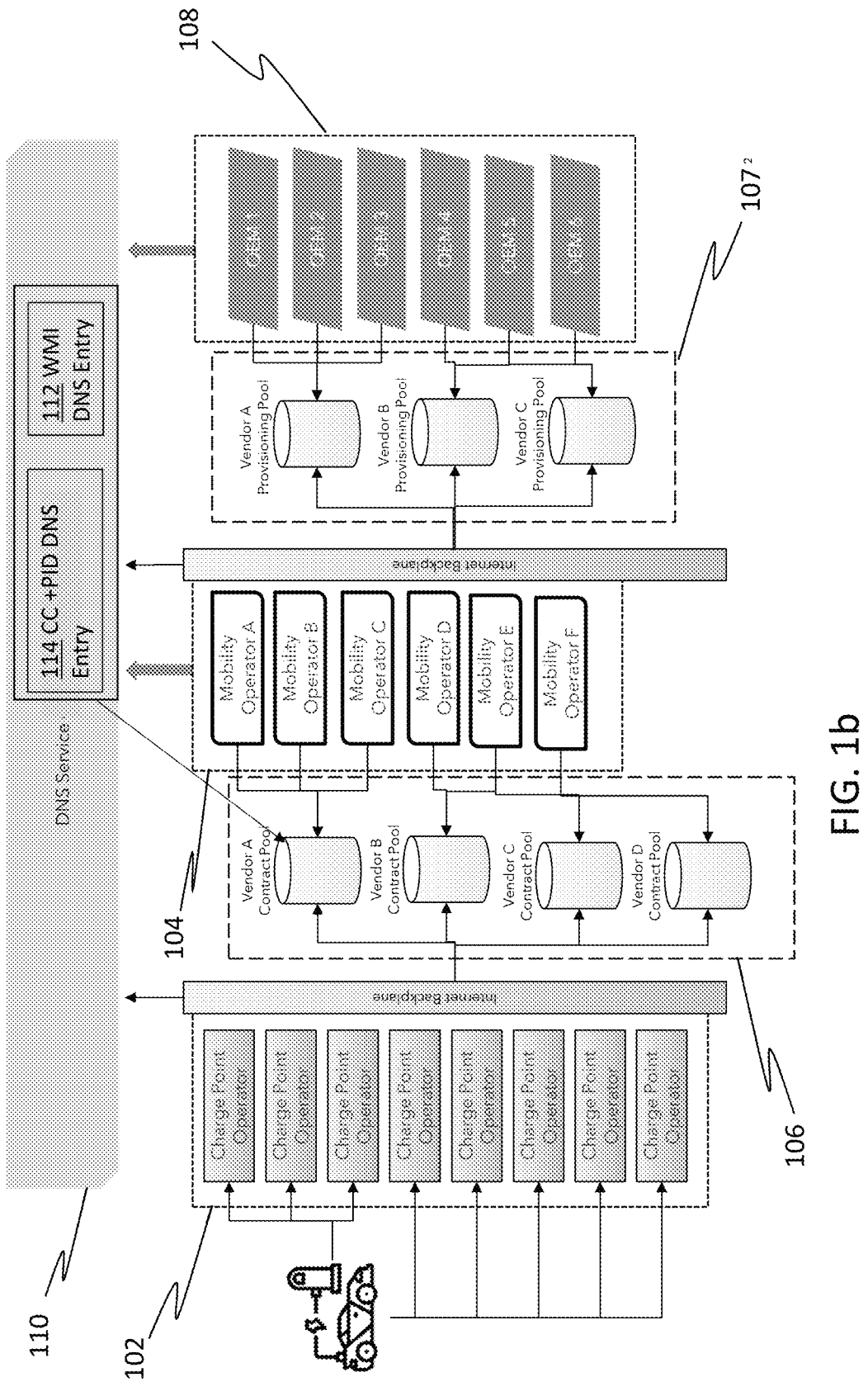
FIG. 1b is a schematic diagram of a computer network architecture corresponding to a Plug and Charge system in accordance with disclosed implementations.

FIG. 1b illustrates an example of an architecture in accordance with disclosed implementations. In FIG. 1b, elements similar to those in FIG. 1a are labelled with like reference numerals. Multiple charge point operators 102 and mobility operators 104 utilize DNS 110 to find the correct address for one or more of contract pools 106. The address can be a direct route to the desired certificate. Alternatively, a special DNS can be setup that would allow mobility operators 104 and OEMs 108 to create routing rules based on the EMAID or PCID associated with a vehicle. In such an instance, when a charge point operator 102 or a mobility operator 104 wishes to access a contract pool 106, they would prepend the EMAID or PCID to a known address. Such as EMAID].CP.PNC.DIRECTORY. Then, the DNS 110 would use the EMAID and provide the caller with the correct IP address to the appropriate contract pool 106 based on the rules. This allows the charge point operator, or mobility operator a more efficient route to get to the correct pool. The request need only build the correct Uniform Resource Locator (URL) given the EMAID or PCID. In a situation in which there are multiple appropriate contract pools 106, DNS 110 can return multiple A records.

As an example, the PCID can be in the form of "WMI+UniqueID+CheckDigit", where WMI is 3 characters long and uniquely identifies the OEM. Further, the EMAID is in the form of "CountryCode+ProviderID+EMA Instance+CheckDigit" where CountryCode+ProviderID is 5 Characters and uniquely identifies the Mobility Operator.

Two example process flows for creating a certificate query and resolving the query to a certificate are set forth below.

Example 1

Figure 2:
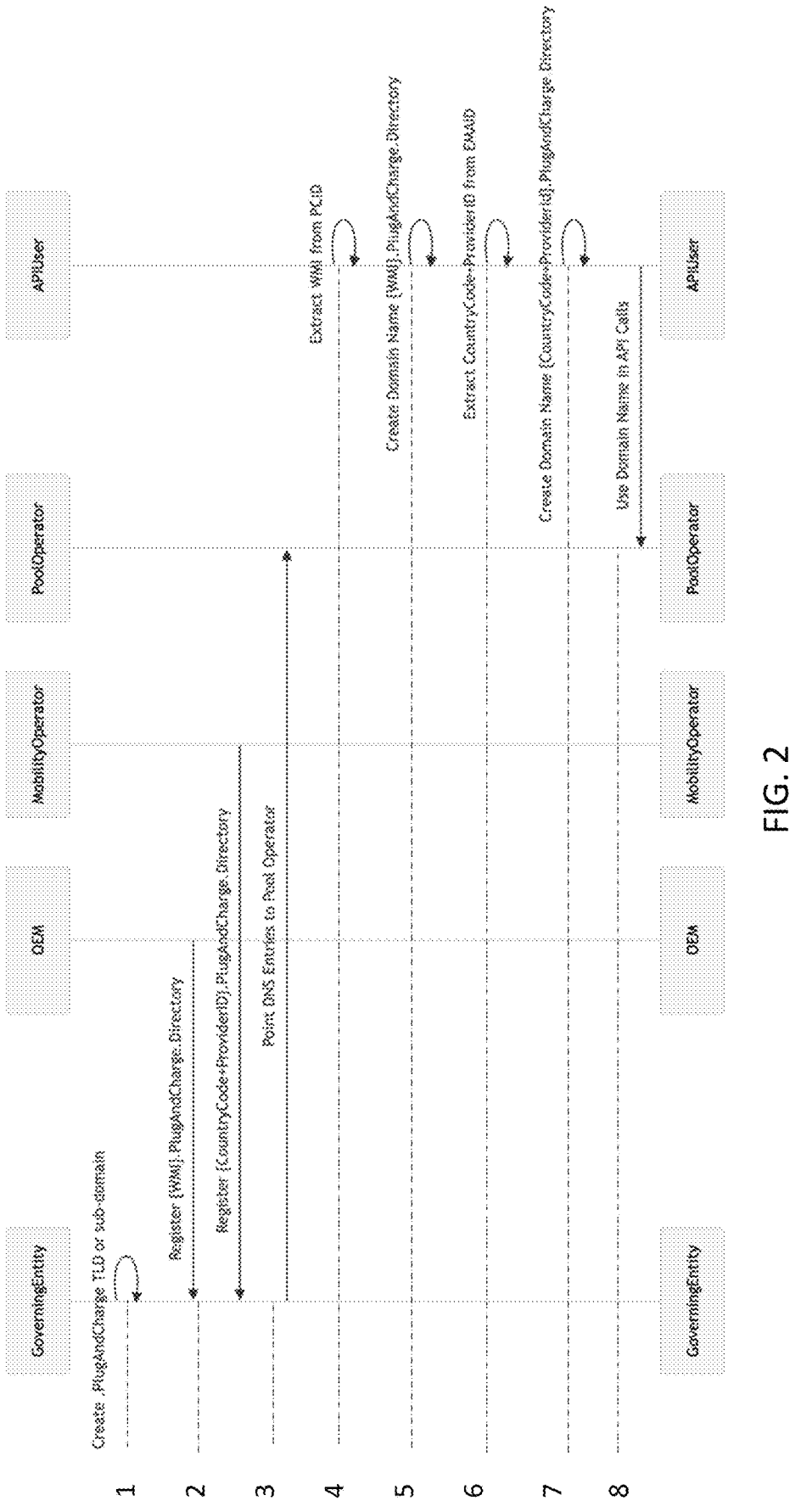
FIG. 2 is a data flow diagram of a first example for enabling a Plug and Charge ecosystem user to get certificate data using a DNS in accordance with disclosed implementations.

FIG. 2 illustrates the steps of a first example of the disclosed implementations. In FIG. 2, the numbers on the left indicate the numbered steps below.

1. A governing entity creates either a new Top Level Domain (e.g., .PlugAndCharge), or creates a well-known sub-domain (e.g., .PlugAndCharge.Directory?).
2. An OEM creates a DNS entry for {WMI}. PlugAndCharge.Directory (112 in FIG. 1b) and the mobility operator creates a DNS entry for {CountryCode+ProviderID}.PlugAndCharge.Directory (114 in FIG. 1b).
3. These DNS Entries are stored in the DNS operated by the governing entity and point to the contract pool that contains the certificates for the OEM/mobility Operator (as specified by the OEM and/or the mobility operator).
4. The API User, such as a user desiring to charge their vehicle, who has access to the PCID (for example, the PCID is securely stored in memory in the vehicle), extracts the first three characters of the PCID (which correspond to the WMI). The WMI extraction can occur in a known manner during a handshake process between the vehicle and the charging station.
5. The API user then and prepends the WMI it to ".PlugAndCharge.Directory". This creates the correct Domain Name reference to the Contract Pool for the given PCID. For example, {WMI}.PlugAndCharge.Directory results in a direct route via DNS to the Contract Pool operator.
6. The API User, having access to the EMAID, extracts the first 5 characters (Country Code+Provider ID).
7. The API user then prepends the Country Code+ProviderD to ".PlugAndCharge. Directory" to create the correct Domain Name referencing the Contract Pool for the given EMAID. {CountryCode+ProviderId}.PlugAndCharge.Directory results in a direct route via DNS to the correct contract pool. This provides access to the Provisioning Certificate in the case of the WMI.PlugAndCharge.Directory, or the Contract Certificate in the case of Country+ProviderID.PlugAndCharge.Directory. Note that more than one address may be returned for the Country+Provider, because the contract certificates may be in two different pools and the caller should check both locations to get all of the relevant contracts.
8. This domain name can then be used in API calls to locate the correct contract pool for the user/provider combination.

Example 2

Figure 3:
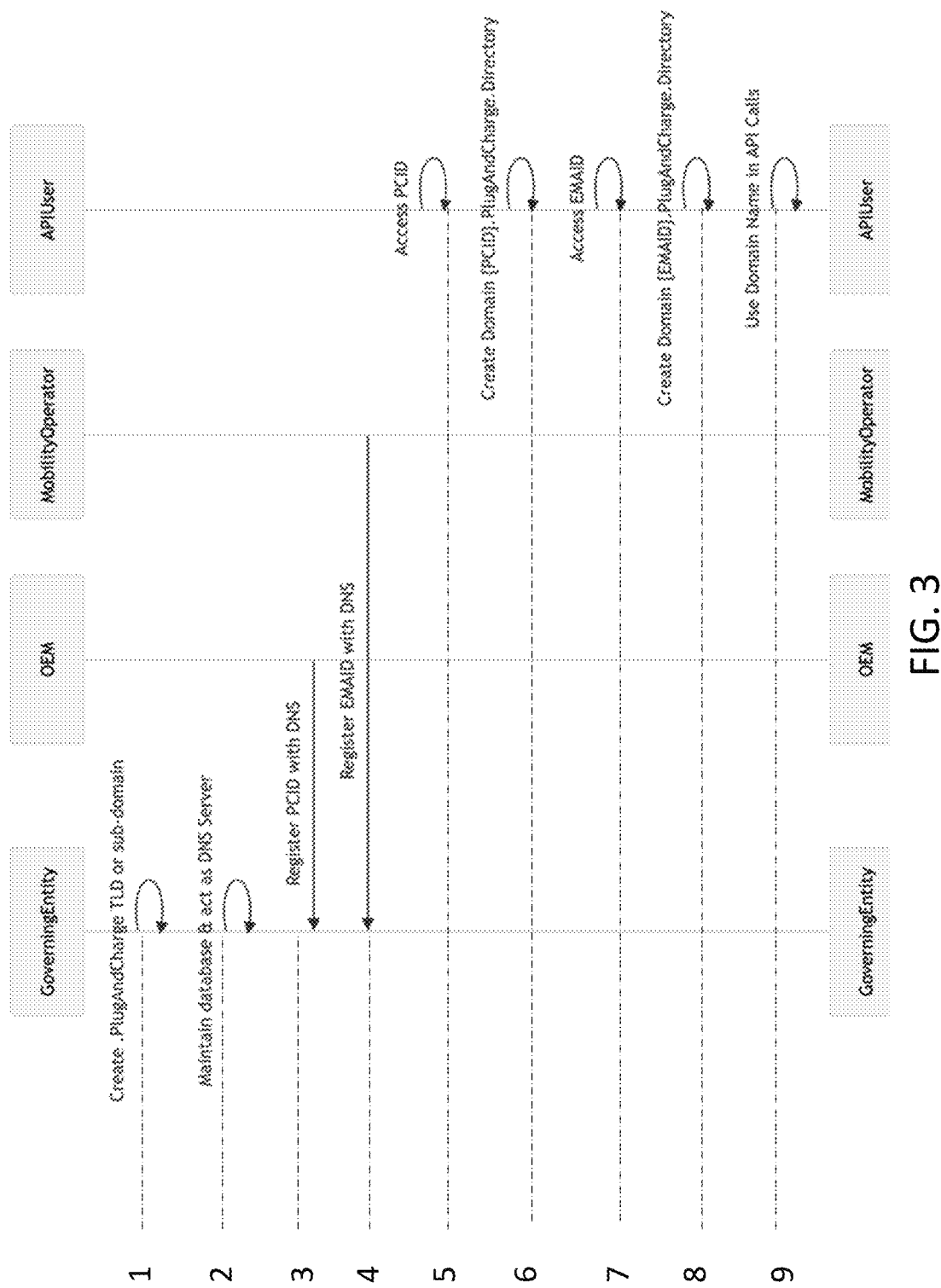
FIG. 3 is a data flow diagram of a second example for enabling a Plug and Charge ecosystem user to get certificate data using DNS in accordance with disclosed implementations.

In this example, the governing entity has the facility to create an Authoritative DNS server that uses a customized database to allow providers OEMs and Mobility Operators to create PCIDs and EMAIDs, thus allowing the API user to more easily create the URL that resolves to the exact Contract Pool. FIG. 3 illustrates the steps of a second example of the disclosed implementations. In FIG. 3, the numbers on the left indicate the numbered steps below.

1. The governing entity creates either a new Top Level Domain (e.g., .PlugAndCharge), or creates a well-known sub-domain (e.g., .PlugAndCharge.Directory?).

2. The governing entity maintains a database that is accessible by OEMs and mobility operators and acts as a DNS Server for entries.

3/4. The governing entity exposes an API to the database to allow OEMs and Mobility Operators the ability to maintain (e.g., Create, Retrieve, Update, Delete) Identifiers along with the pool operator base URI.

5. The API User, accesses the PCID.

6. The API user creates a domain name by prepending the PCID to the well-known domain name, e.g., {PCID}.PlugAndCharge.Directory. This results in a direct route via DNS to the Provisioning Pool Operator.

7. The API User, access the EMAID.

8. The API user creates a domain name by prepending the EMAID to the well-known domain name, e.g., {EMAID}.PlugAndCharge.Directory. This results in a direct route via DNS to the contract pool.

9. This domain name is then used in API calls.

Example 3

Figure 4:
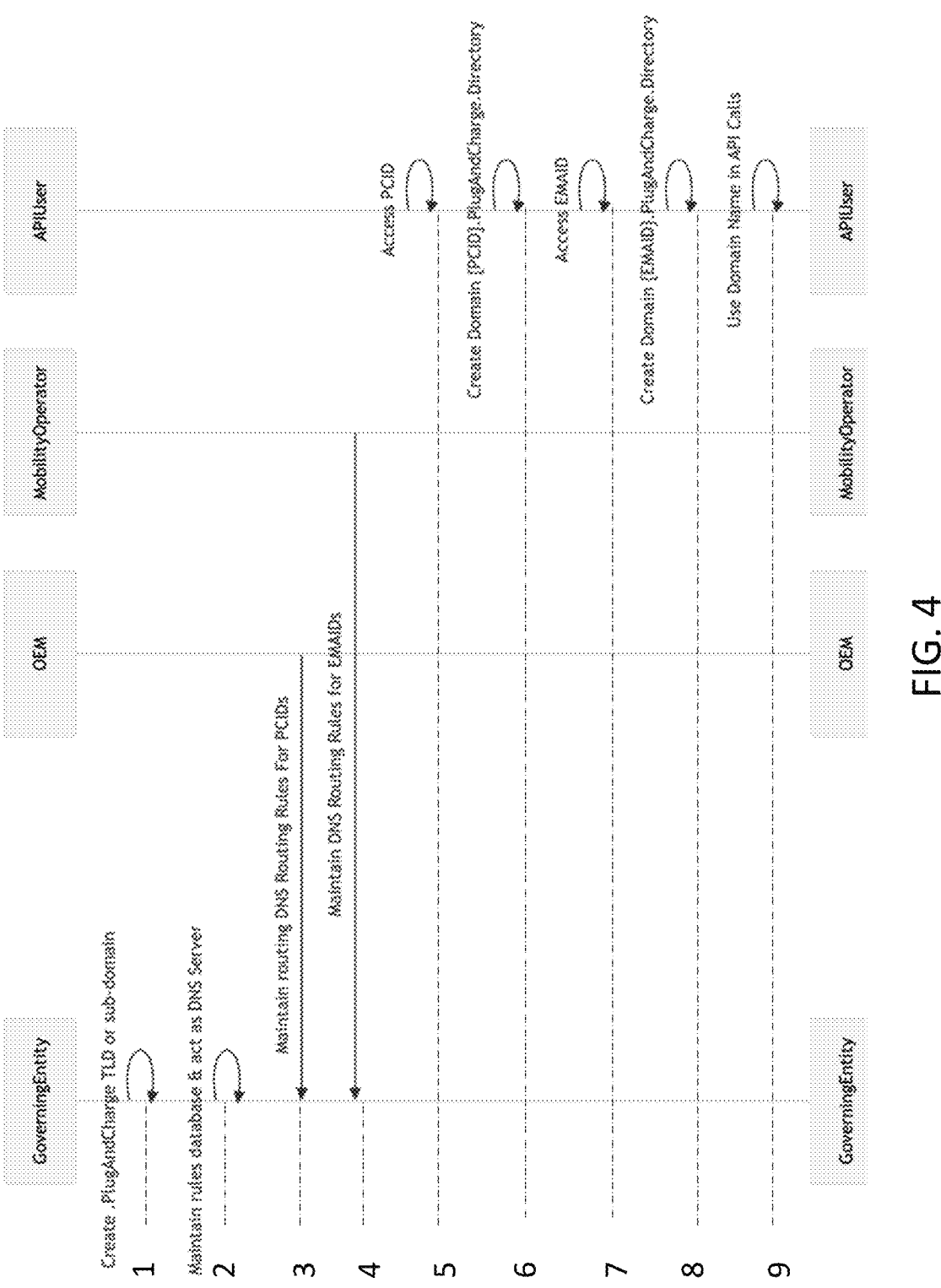
FIG. 4 is a data flow diagram of a third example for enabling a Plug and Charge ecosystem user to get certificate data using a DNS in accordance with disclosed implementations.

FIG. 4 illustrates a third example of the disclosed implementations. In this example a rules-based scenario is applied. In particular, in some instances an entire ID (PCID or EMAID) could be sent to the DNS and the DNS would need to parse to parse the ID to determine the WMI or CountryCode+ProviderID that would allow for further routing to a downstream DNS Server at the host site. The host site would then take the ID and further route it within their own network. A set of rules can be applied to obtain the addresses for this further routing.

This example is similar to the second example described with reference to FIG. 3, in that the API User prepends the WMI or EMAID to the base address. However, instead of requiring that the OEM and Mobility Operator register each PCID and EMAID with the DNS Server, the parties instead maintain a set of routing rules that tests the ID and, based on the rules, returns the appropriate address for the pool. In FIG. 4, the numbers on the left indicate the numbered steps below.

The governing entity creates either a new Top Level Domain (e.g., .PlugAndCharge), or creates a well-known sub-domain (e.g., .PlugAndCharge.Directory?).

2. The governing entity maintains a rules database that is accessible by OEMs and mobility operators and acts as a DNS Server for entries.

3/4. The governing entity exposes an API to the database to allow OEMs and mobility operators the ability to maintain (e.g., Create, Retrieve, Update, Delete) rules along with the pool operator base URI.

5. The API User, accesses the PCID.

6. The API user creates a domain name by prepending the PCID to the well-known domain name, e.g., {PCID}.PlugAndCharge.Directory. This results in a direct route via DNS to the Contract Pool.

7. The API User, accesses the EMAID.

8. The API user creates a domain name by prepending the EMAID to the well-known domain name, e.g., {EMAID}.PlugAndCharge.Directory. This results in a direct route via DNS to the Contract Pool.

9. This domain name is then used in API calls and the correct certificate is retrieved based on the routing rules.

When routing rules are used, the entire EMAID can be prepended to the well-known URL. The DNS Server in this case uses predefined rules to parse the EMAID and use that information to determine location. For example, if the part of the contract certificates are stored in location A and part are stored in Location B, the Mobility Operator could setup a rule that says any EMAID that has an X in position 10 are routed to Location B, everyone else goes to Position A.

For example, a simple set of rules is set for the below.

If the PCID starts with JKL and the 6th character is V, send to 127.0.0.1.

If the PCID starts with JKL and the 6th character is X, send to 192.168.1.2.

If the PCID starts with JKL and no other match, send to 172.127.0.1

A set of rules can include the following attributes:

timestamp—the last time that the data was updated.

version—the version of the record. Currently 1.0.0 defaultLocation—location that is returned if no patterns match patterns—list of patterns that are used to attempt a match with the incoming identifier type—the type of the match startswith regex contains endswith pattern—the pattern to match location—the location that should be returned if the pattern matches The ruleset data should be retained as long as the system needs to return data for the given organization. The data should be stored in a secure manner, e.g., stored encrypted at rest as S3 objects.

Figure 5:
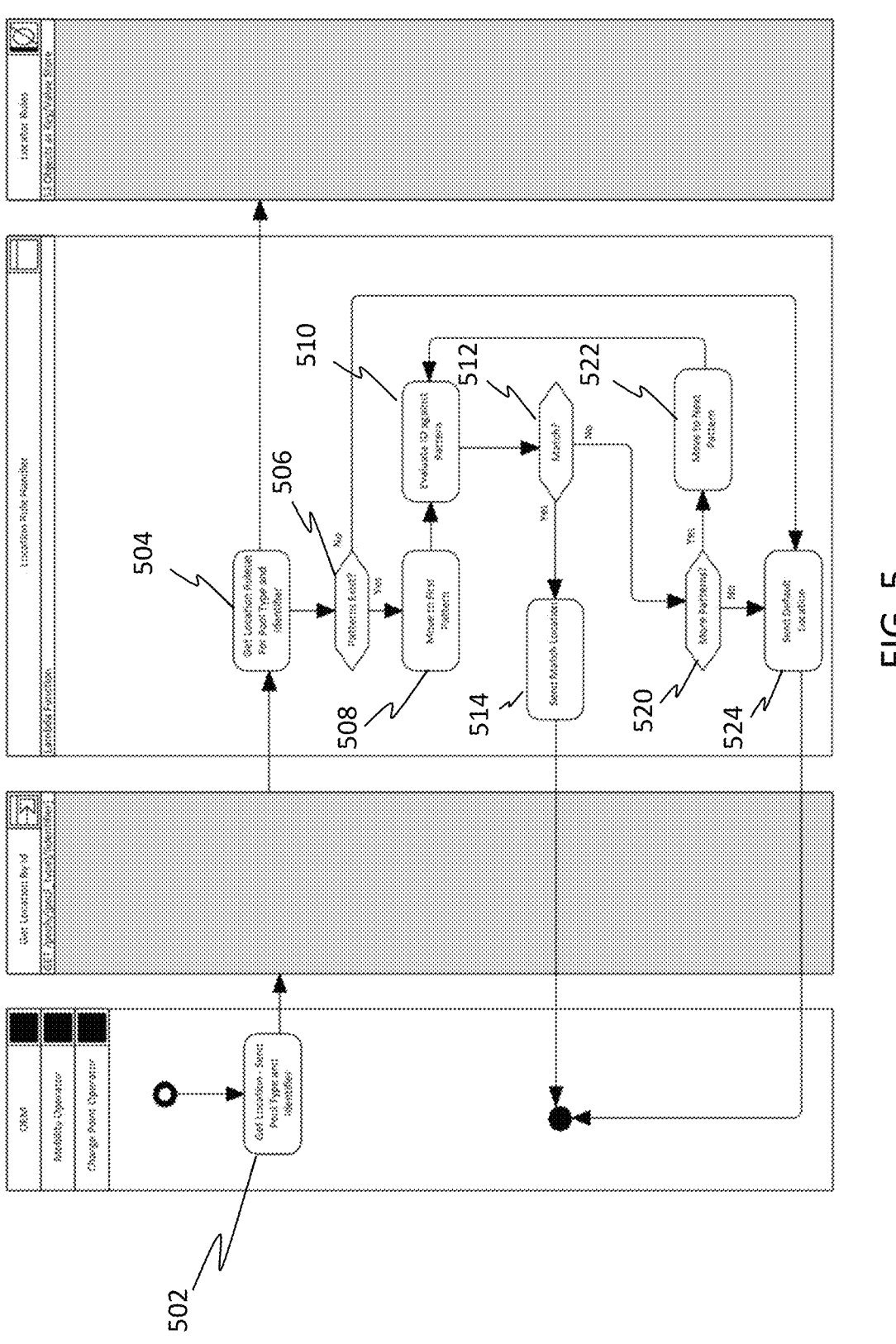
FIG. 5 is a flow chart of and example of a process for applying a ruleset to locate a certificate in accordance with disclosed implementations.

FIG. 5 illustrates an example of a process for applying routing rules in accordance with disclosed implementations. At 502, a pool type and pool identifier are received, as a result of an API call including a URL constructed in the manner described above, for example. At 504, a ruleset corresponding to the pool type and identifier are retrieved. at 506, a pattern matching algorithm is applied to determine of a specified pattern, such as predetermined value in a PCID, exists in the URL. If the pattern exists, the process moves to step 508. If the pattern does not exist, the process continues to step 524 at which a predetermined default location for the certificate is sent to the certificate requestor.

Assuming the pattern does exist in the URL at step 506, the pattern is extracted, and, at step 510, the ID is evaluated against the pattern based on the rule set. At step 512, if it is determined that there is a match between the pattern and a rule in the ruleset, the corresponding certificate location specified by the rule is sent to the requesting party. If, at step 512, there is not a match, the process proceeds to step 520 to determine if there is another pattern specified in the rule set. If there is another pattern, the process proceeds to step 522 and the next pattern is evaluated in steps 512 et seq. If there is not another pattern, the default location is sent at step 524.

DNS 110 of FIG. 1 can be configured to:

allow any user authenticated on the network to be able to resolve a location for a contract pool based on a vehicle identifier;

provide security constraints such that only authorized callers may update rulesets;

provide flexibility in rules to accommodate multiple methods for resolving Identifiers to their locations;

provide a default location for the organizations Identifiers such that if no rules match, the default is returned;

for future development, ensure that the locator rule record contains a timestamp and version information property; and/or given a pool type and identifier, return the location of the certificate pool that contains the certificate record.

All functions disclosed herein can be implemented as "modules" of computer readable code stored on non-transitory media and executed by one or more computer hardware processors. The disclosure refers to several entities, such as mobility operators, OEMs, and charge point operators. Reference to these entities herein is intended to encompass any computing devices and/or systems associated with the entity that are used by the entity for communication over a computer network and the processing functions described herein. The above-described embodiments and implementations are intended to be examples only. Alterations, modifications and variations may be affected to the particular embodiments by those of skill in the art without departing from the scope of the invention, which is defined by the claims appended hereto.

What is claimed is:

1. A method comprising:
receiving a user identifier, the user identifier associated with a user;
receiving a charge provider identifier, the charge provider identifier associated with one or more charge providers;
generating a first fully qualified domain name by prepending the user identifier to a predetermined domain name of a domain name system (DNS);
generating a second fully qualified domain name by prepending the charge provider identifier to the predetermined domain name;
wherein the DNS stored the user identifier and the charge provider identifier as a DNS entry pointing to a corresponding charge pool operator computing system, the DNS entry using a CNAME or an A record to point to an internet address of a pool operator, whereby the first fully qualified domain name specifies a direct route via the DNS to correct contract pool operator and the second fully qualified domain name specifies a direct route via the DNS to correct contract pool; and
using the first fully qualified domain name and the second fully qualified domain name in an application program interface (API) call for a certificate in a Plug and Charge ecosystem.

2. The method of claim 1, wherein the user identifier is extracted from a Plug and Charge Identifier (PCID) and the charge provider identifier is extracted from an Electric Mobility Account Identifier (EMAID).

3. The method of claim 1, wherein the charge provider identifier is extracted from an Electric Mobility Account Identifier (EMAID).

4. The method of claim 1, wherein the DNS is used by internet users worldwide.

5. The method of claim 1, further comprising creating a unique Top-Level Domain or a sub-domain by a governing entity as the predetermined domain name and wherein the governing entity maintains a DNS database that is accessible by Original Equipment Manufacturers (OEMs) and Mobility Operators.

6. A system comprising:
a processor; and
a memory device storing instructions thereon, which when executed by the processor, cause the processor to carry out steps of:
receiving a user identifier, the user identifier associated with a user;
receiving a charge provider identifier, the charge provider identifier associated with one or more charge providers;

generating a first fully qualified domain name by prepending the user identifier to a predetermined domain name of a domain name system (DNS);
generating a second fully qualified domain name by prepending the charge provider identifier to the predetermined domain name;
wherein the DNS stored the user identifier and the charge provider identifier as a DNS entry pointing to a corresponding charge pool operator computing system, the DNS entry using a CNAME or an A record to point to an internet address of a pool operator, whereby the first fully qualified domain name specifies a direct route via the DNS to correct contract pool operator and the second fully qualified domain name specifies a direct route via the DNS to correct contract pool; and
using the first fully qualified domain name and the second fully qualified domain name in and application programming interface (API) call for a certificate in a Plug and Charge ecosystem.

7. The system of claim 6, wherein the user identifier is extracted from a Plug and Charge Identifier (PCID) and the charge provider identifier is extracted from an Electric Mobility Account Identifier (EMAID).

8. The system of claim 6, wherein the charge provider identifier is extracted from an Electric Mobility Account Identifier (EMAID).

9. The system of claim 6, wherein the DNS is used by internet users worldwide.

10. The system of claim 6, wherein the steps further comprises creating a unique Top-Level Domain or a sub-domain by a governing entity as the predetermined domain name and wherein the governing entity maintains a DNS database that is accessible by Original Equipment Manufacturers (OEMs) and Mobility Operators.

11. A non-transitory computer readable media having instructions thereon which, when executed by a computer processor, cause the computer processor to carry out a method comprising:
receiving a user identifier, the user identifier associated with a user;
receiving a charge provider identifier, the charge provider identifier associated with one or more charge providers;
generating a first fully qualified domain name by prepending the user identifier to a predetermined domain name of a domain name system (DNS);
generating a second fully qualified domain name by prepending the charge provider identifier to the predetermined domain name;
wherein the DNS stored the user identifier and the charge provider identifier as a DNS entry pointing to a corresponding charge pool operator computing system, the DNS entry using a CNAME or an A record to point to an internet address of a pool operator, whereby the first fully qualified domain name specifies a direct route via the DNS to correct contract pool operator and the second fully qualified domain name specifies a direct route via the DNS to correct contract pool; and
using the first fully qualified domain name and the second fully qualified domain name in and application programming interface (API) call for a certificate in a Plug and Charge ecosystem.

12. The non-transitory computer readable media of claim 11, wherein the user identifier is extracted from a Plug and Charge Identifier (PCID) and the charge provider identifier is extracted from an Electric Mobility Account Identifier (EMAID).

13. The non-transitory computer readable media of claim 11, wherein the charge provider identifier is extracted from an Electric Mobility Account Identifier (EMAID).

14. The non-transitory computer readable media of claim 11, wherein the DNS is used by internet users worldwide.

15. The non-transitory computer readable media of claim 11, wherein the method further comprises creating a unique Top-Level Domain or a sub-domain by a governing entity as the predetermined domain name and wherein the governing entity maintains a DNS database that is accessible by Original Equipment Manufacturers (OEMs) and Mobility Operators.

* * * * *